United States Patent

Sumiyoshi et al.

[15] 3,680,410
[45] Aug. 1, 1972

[54] ACTUATING OIL PRESSURE CONTROL SYSTEM FOR TORQUE CONVERTER AUTOMATIC TRANSMISSION

[72] Inventors: Masaharu Sumiyoshi; Osamu Ito, both of Toyota; Hisato Wakamatsu, Kariya; Takaaki Kato; Hisasi Kawai, both of Toyohashi, all of Japan

[73] Assignees: Toyota Jidosha Kogyo Kabushiki Kaisha, Toyota-shi; Nippondenso Kabushiki Kaisha, Kariya-shi, Japan

[22] Filed: Aug. 11, 1970

[21] Appl. No.: 62,793

[30] Foreign Application Priority Data

Sept. 13, 1969 Japan..........................44/73132
Nov. 11, 1969 Japan..........................44/90244
Dec. 27, 1969 Japan..........................45/1401
Dec. 27, 1969 Japan..........................45/1402

[52] U.S. Cl.................................................74/866
[51] Int. Cl............................................B60k 21/00
[58] Field of Search..........................................74/866

[56] References Cited

UNITED STATES PATENTS

| 3,433,101 | 6/1969 | Scholl et al. | 74/866 |
| 3,435,713 | 4/1969 | Pfisterer et al. | 74/866 |
| 3,478,851 | 11/1969 | Smyth et al. | 74/866 |

Primary Examiner—C. J. Husar
Attorney—Cushman, Darby & Cushman

[57] ABSTRACT

In a torque converter automatic transmission comprising a torque converter, a speed change gear having friction engaging means, and a hydraulic actuation circuit to supply pressure oil to the friction engaging means, an actuating oil pressure control system comprising a vehicle speed detecting circuit for generating an electrical signal corresponding to the vehicle speed, a load detecting circuit for generating an electrical signal corresponding to the vehicle loading, an operational circuit adapted to receive as the inputs thereto and operate on the output signals from said two detecting circuits in accordance with an equation so as to generate an output voltage, a sawtooth voltage having a constant period, a comparator circuit for comparing the output sawtooth voltage of the sawtooth wave generating circuit with the output voltage of the operational circuit to generate a rectangular voltage having a time width corresponding to said equation, and means for varying the actuating oil pressure of the oil under pressure supplied to the friction engaging means according to the output rectangular voltage of the comparator circuit, whereby said actuating oil pressure is controlled in accordance with variations in the time width of the output rectangular voltage of the comparator circuit.

10 Claims, 15 Drawing Figures

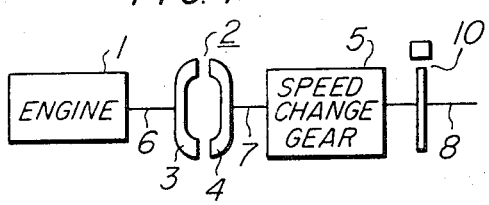
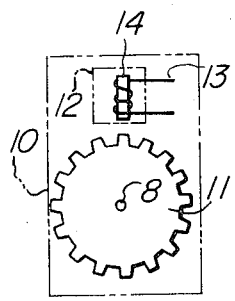
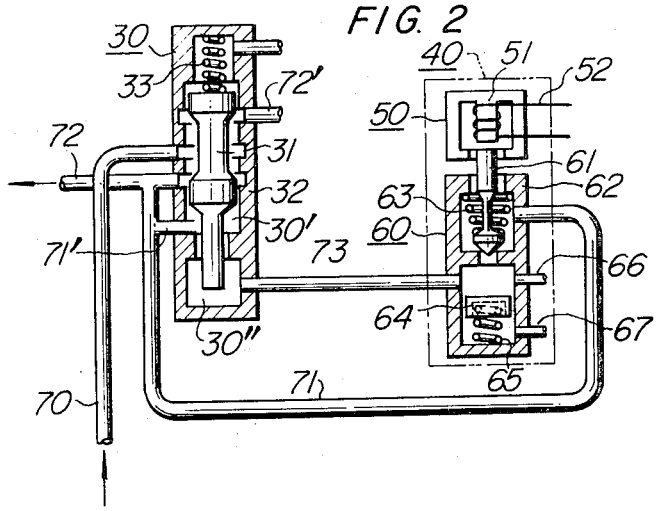
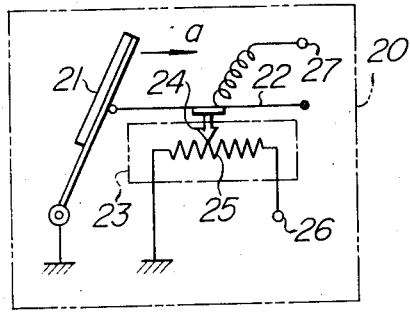
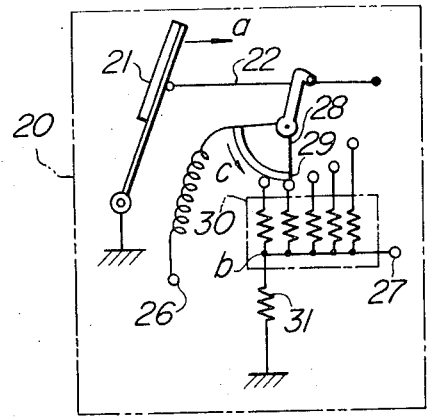

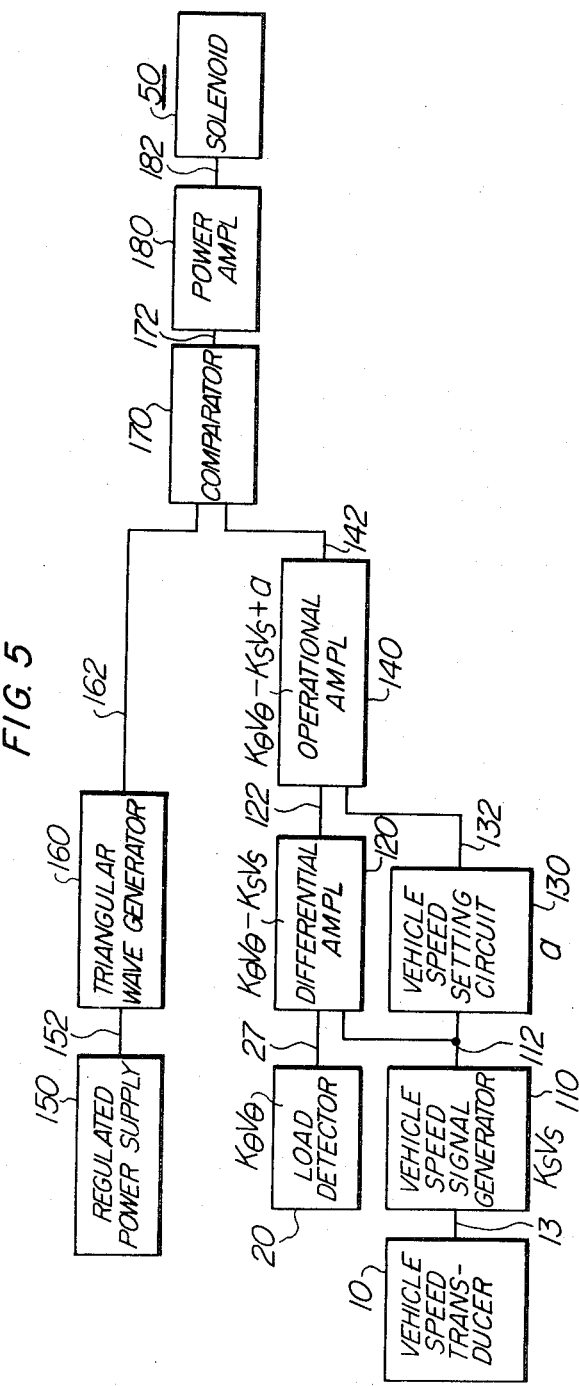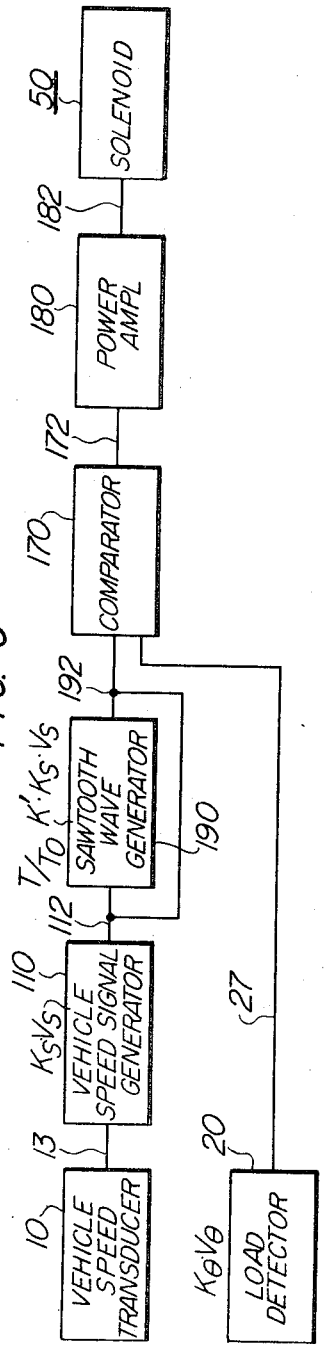

ly converter.

ACTUATING OIL PRESSURE CONTROL SYSTEM FOR TORQUE CONVERTER AUTOMATIC TRANSMISSION

The present invention relates to an actuating oil pressure control system which ensures smooth gear changes in an automatic transmission equipped with a torque converter.

When changing from one gear ratio to another in a conventional torque converter automatic transmission, if there is a big difference between the torque generated by the engine and the torque loaded by the vehicle, an impulsive transmission and consumption of force occurs, and this results in a large (but brief) acceleration or deceleration of the vehicle.

To overcome these defects, a method has been generally practiced in which the actuating oil pressure for shift controlling purposes is varied or regulated by means of complicated hydraulic control circuitry. For example, a throttle valve is used to vary the actuating oil pressure in proportion to the degree of depression of an accelerator pedal and a governor valve is also used to vary the actuating oil pressure in accordance with the vehicle speed. The pressure oil provided by these two valves varies the setting of a constant pressure valve to regulate the actuating oil pressure to a suitable value. However, it is no easy matter to ensure satisfactory gear changing operations over a wide range of variations in the torque of the engine and the load, and moreover there is a problem in that since the complicated hydraulic circuit for controlling the actuating oil pressure is built in the transmission as previously explained, the transmission greatly increase in size and weight so that it is unsuitable for the smaller type of the vehicles, particularly the smaller automobiles.

The present invention contemplates to solve these difficulties and its essential objects are as follows:

1. Firstly, an equation is obtained expressing a certain relationship between an electrical signal corresponding to the loading of the vehicle which is determined in accordance with the degree of depression of the accelerator pedal and the throttle valve opening and an electrical signal corresponding to the vehicle speed, whereby by using this equation a higher actuating oil pressure is supplied to the friction engaging means of a speed change gear at heavy loads and low vehicle speeds, while a lower actuating oil pressure is applied to the friction engaging means at low loads and high vehicle speeds, thereby ensuring smooth engagement and disengagement of the friction engaging means upon gear changing operations without any shock.
2. Secondly, when the pressure of a pressure oil produced by a pressure increasing valve in the actuating oil pressure control system is increased according to the said equation, a constant pressure valve in the said actuating oil pressure control system is effected to change the setting of the constant pressure valve so as to reduce the actuating oil pressure produced by the constant pressure valve.
3. Thirdly, the pressure increasing valve used to change the setting of the constant pressure valve is only one and the object stated in the above (2) is achieved with this single pressure increasing valve.
4. Fourthly, rectangular pulses having a time width as determined by the aforementioned equation are provided such that the solenoid of a pressure increasing valve in the actuating oil pressure control valve system is intermittently energized with the rectangular pulses to continuously change the setting of a constant pressure valve in the actuating oil pressure control valve system in accordance with the integrated values of the pressure oil delivered from the pressure increasing valve, whereby the actuating oil pressure applied to the friction engaging means of a speed gear train are controlled in accordance with variations in the time width of the rectangular pulses.
5. Fifthly, when both the vehicle speed and the load are zero, that is, the vehicle is at rest, the minimum predetermined actuating oil pressure is applied to the friction engaging means of a speed change gear, whereby the occurrence of shock upon the actuation of a shift lever is eliminated.
6. Sixthly, the relation of the actuating oil pressure to the vehicle speed is represented by hyperbolic curves with the vehicle load being the parameter, so that an actuating oil pressure control system is provided which at the same time is capable of achieving the object mentioned in the above (1) and maintaining the actuating oil pressure at a desired value even the vehicle load (throttle opening) is zero.
7. Seventhly, the relation of the actuating oil pressure to the vehicle speed is represented by straight lines whose slopes are varied with the vehicle load being the parameter, thereby achieving the same object mentioned in the above (6).
8. Eighthly, for examples provision is made to ensure that unnecessarily high pressure oil is not supplied to the speed change gear because, for a torque converter automatic transmission having three forward speeds and one reverse, the occurrence of shock upon gear changes can be eliminated by varying the actuating oil pressure within the following ranges: 1st gear, 6 to 10 $Kg/cm^2$; 2nd gear, 4 to 8 $Kg/cm^2$; 3rd gear, 4 to 7 $Kg/cm^2$; and reverse gear, 10 to 15 $Kg/cm^2$, whereas if the oil pressure becomes higher than the actuating oil pressures suitable for these gear positions, oil under unnecessarily high pressure is supplied to the torque converter and the friction engaging means, so that the output of the engine is correspondingly wasted. To be more particular, according to the present invention, provision is made to ensure that the actuating oil pressure never exceeds, for example, the oil pressure set for the second gear when making a downshift from the second to the first gear so that the shock caused by the gear changes is reduced, to thereby provide a confortable ride and eliminate the power loss in the hydraulic circuit.

Those remarkable effects attributable to the present invention may be summarized as follows:

1. According to the present invention, an equation is derived expressing a certain relationship set up by an electrical signal corresponding to the vehicle speed and an electrical signal corresponding to the vehicle loading represented such as by the degree of depression of an accelerator pedal so as to control the actuating oil pressure supplied to the friction engaging means of a speed change gear in accordance with this equation, and thus it is possible to eliminate a shifting shock due to a torque change caused upon gear change and at the same time to provide both a suitable and sufficient pressure for engaging the frictional engaging means of the speed change gear, ensuring faster gear changes as well.

2. According to the present invention, the time width of a rectangular voltage is modulated in accordance with the aforesaid equation such that there is provided an actuating oil pressure control system for a torque converter automatic transmission, in which the actuating oil pressure is controlled by means of a solenoid valve that is the simplest form of an electrical actuator and which moreover has a low ratio of trouble and a long life, is small in size and light in weight and is suitable for use with smaller type vehicles, particularly smaller automobiles.

3. According to the present invention, when a predetermined vehicle speed is exceeded, a constant voltage is generated so that a constant term is added to the previously explained equation according to this constant voltage. Thus, when the vehicle is at rest, a pressure oil at an especially low actuating oil pressure is supplied to the friction engaging means of a speed change gear, so that it is possible to eliminate a shock caused when the shift lever is moved from either the parking (P) position or the neutral (N) position into either the reverse (R) or the drive (D) position.

4. According to the present invention, a single pressure increasing valve is actuated by means of a rectangular voltage having a time width corresponding to the aforesaid equation so that a pressure increasing oil pressure corresponding to said dual simple equation is produced to change the setting of a constant pressure valve. Thus, there is provided an actuating oil pressure control system for a torque converter automatic transmission which requires only a simple hydraulic circuit, is made smaller and lighter and is well suited for use with smaller type vehicles, particularly smaller automobiles.

5. According to the present invention, a pressure increasing valve is used in combination with a constant pressure valve such that the pressure increasing valve is operated on a time modulation system to change the setting of the constant pressure valve by means of a smoothed unidirectional pressure increasing oil from the pressure increasing valve. Thus, an actuating oil pressure control system is realized which is stable and highly reliable in operation and which has a low ratio of trouble and a longer life.

6. According to the present invention, an electrical signal corresponding to the vehicle speed is integrated to generate a sawtooth signal having a constant period so that the sum signal of this sawtooth signal and the vehicle speed signal is compared with an electrical signal corresponding to the vehicle load so as to actuate a solenoid with the resultant output rectangular pulse. Thus, it is possible to control the actuating oil pressure supplied to the friction engaging means of a speed change gear, with the actuating oil pressure and the vehicle speed being so interrelated with each other that the functional relation therebetween is defined by hyperbolic curves with the vehicle load as the parameter, whereby a shifting shock due to a torque change caused upon gear change is eliminated and at the same time the actuating oil pressure is maintained at a desired value even when the accelerator pedal is depressed moderately so as to apply a both suitable and sufficient pressure to engage the friction engaging means of the speed change gear, ensuring faster gear changes as well.

7. According to the present invention, an electrical signal corresponding to the vehicle load is integrated to generate a sawtooth signal having a constant period so that this sawtooth signal is compared with an electrical signal corresponding to the vehicle speed to energize a solenoid with the resultant output rectangular pulse. Thus, with the actuating oil pressure and the vehicle speed being interrelated with each other such that the relation therebetween is represented by a straight line and the slope of this line is varied according to the vehicle loading to represent the functional relation therebetween, it is possible to control the actuating oil pressure supplied to the friction engaging means of a speed change gear. Thus, a shifting shock due to a torque change caused upon gear change is eliminated and at the same time the actuating oil pressure is maintained at a desired value to supply a both suitable and sufficient pressure to engage the friction engaging means of the speed change gear, in addition to faster gear changes.

8. According to the present invention, an electrical signal corresponding to the vehicle load and an electrical signal corresponding to the vehicle speed are operated on in an operational circuit whose output rectangular pulses energize a solenoid through a pulse width limiting circuit adapted to prevent the pulse width of these rectangular pulses from exceeding the respective preset pulse widths corresponding to the various gear positions. Thus, greater effectiveness is achieved in that the actuating oil pressure supplied to the friction engaging means of a speed change gear is controlled by relating the actuating oil pressure with the vehicle load and the vehicle speed such that there is a certain functional relation therebetween, while at the same time it is possible to regulate at a constant pressure the actuating oil pressure which will inevitably become excessively high at the downshift point if it were so selected that the optimum actuating oil pressure occurs at the upshift point because of the feature of the automatic transmission that the up point and the down point differ for each shift point, whereby a shock at the downshift point is reduced and at the same time the power lost in maintaining a high oil pressure is reduced.

Other objects, features and advantages will be readily apparent from the detailed descriptions of the embodiments of the present invention taken in conjunction with the accompanying drawings, in which:

FIG. 1 is a block diagram schematically showing a torque converter automatic transmission embodying the present invention;

FIG. 2 is a partial longitudinal section showing an embodiment of the actuating oil pressure control valve assembly incorporated in the system of the present invention;

FIG. 3 is a block diagram showing an embodiment of the vehicle speed transducer incorporated in the system of the present invention;

FIG. 4a and FIG. 4b are block diagrams showing embodiments of the load detecting circuit incorporated in the system of the present invention;

FIG. 5 is a block diagram showing a first embodiment of the electrical control circuit incorporated in the system of the present invention;

FIG. 6 is a block diagram of a second embodiment of the electrical control circuit in the system of the present invention;

Figure 7:
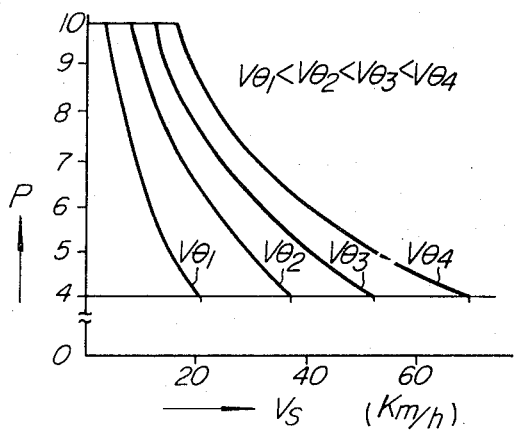
FIG. 7 is a characteristic diagram showing the relationship between the actuating oil pressure for the torque converter and the vehicle speed in the system of the present invention with the vehicle load being the parameter.

The construction of a torque converter automatic transmission will be first explained in which, as shown in FIG. 1, a main shaft 6 of an engine 1 is connected to a pump 3 of a torque converter 2 and a torque converter turbine 4 is connected to a speed change gear 5 through a turbine output shaft 7. Although there is a stator used between the pump 3 and the turbine 4, it is not shown since the stator has nothing to do with the objects of the present invention. As is well known in the art, the speed change gear 5 is composed of speed reducing means consisting of a gear train and friction engaging means actuated by a pressure oil, and the actuating oil pressure for the friction engaging means is supplied from an oil pressure source (not shown) through an actuating oil pressure control valve assembly and an actuating oil pressure circuit. An output shaft 8 of the speed change gear 5 transmits the torque to the wheels of vehicle which are not shown. The speed change gear output shaft 8 has a vehicle speed transducer 10 mounted thereon.

The oil under pressure is produced by means of a gear pump (not shown) which is driven by the main shaft 6 of the engine 1 shown in FIG. 1, and this pressure oil is delivered to a constant pressure valve 30 through an oil passage 70 of the actuating oil pressure control valve assembly 30 shown in FIG. 2, so that the pressure oil of a constant actuating oil pressure is delivered through an oil passage 72 and the hydraulic actuation circuit to the friction engaging means of the speed change gear 5 shown in FIG. 1. On the other hand, the pressure oil in the oil passage 72 is introduced into a pressure increasing valve 40 through an oil passage 71, so that the pressure increasing oil from the valve 40 is directed through an oil passage 73 into a lower chamber 30'' of the constant pressure valve 30 to change the pressure setting of the constant pressure valve 30. The constant pressure valve 30 comprises a valve spool 31, a valve body 32 and a valve spring 33, so that the pressure oil admitted into the valve via the oil passage 70 is delivered into the oil passage 72 through between the valve spool 31 and the valve body 32. On the other hand, a portion of the oil under pressure is discharged to the outside of the valve body 32 through an oil exhaust port 72', and a portion of the pressure oil is also admitted into the lower chamber 30' via an oil passage 71' to raise the valve spool 31 against the opposing force of the spring 33 to throttle the pressure oil discharge through the oil passage 72 so as to reduce the oil pressure (actuating oil pressure) of the pressure oil discharged through the oil passage 72, whereby the valve spool 31 is held stationary at a point where the depressing force of the spring 33 and the force of the pressure oil in the lower chamber 30' thrusting the valve spool 31 upward balance with each other to thereby maintain the actuating oil pressure at a constant value. It is assumed that the constant pressure valve 30 produces, for example, the actuating oil pressure at 10 Kg/cm$^2$ when there is no pressure increasing oil admitted into the lower chamber 30''. Then, as the pressure increasing oil is admitted into the lower chamber 30' of the constant pressure valve 30 from the pressure increasing valve 40 through the oil passage 73, the force of this pressure increasing oil acting to move the valve spool 31 upward is additionally applied to the valve spool 31, so that there is produced the same effect as if the spring 33 were replaced with a spring having a weaker spring force and the actuating oil pressure is thus reduced and remains constant at this reduced value. The pressure increasing valve 40 is composed of a solenoid 50 and a valve 60. The solenoid 50 comprises a core 51 and a coil 52 wound on the core 51, so that when the coil 52 is energized the core 51 attracts a valve stem 61 to open a valve 60, and the valve 60 is closed when the coil 52 is de-energized.

The valve 60 comprises the valve stem 61, a valve body 62, a smoothing valve 64 and springs 63 and 65. While the valve stem 61 is shown in the form of a needle valve, the valve stem 61 is in no way limited to it and any valves capable of opening and blocking the oil passages such as a three-way spool valve (cylindrical valve) may be used. The valve stem 61 is normally urged downward by the spring 63 and the upper portion of the valve stem 61 is used as the moving core of the solenoid 50. The smoothing valve stem 64 is normally urged upward by the spring 65, so that it moves downwards by yielding the spring 65 when the pressure increasing oil is entered into the upper portion of the valve spool 61 and it moves upward when the supply of the pressure increasing oil is cut off. The function of the smoothing valve 64 is limited or controlled by a drain 66 which performs a throttling action such that it is rendered inoperative for those oil pressure variations which exceed a preset period, and below this period it is actuated in response to the oil pressure variations of the pressure increasing oil to reduce the pressure variations of the pressure increasing oil, thereby ensuring the supply of the constant pressure increasing oil to the constant pressure valve 30 which corresponds to the speed and the load of the vehicle.

A drain 66 is designed to perform a throttling action to exhaust to the outside of the valve body 62 a portion of the pressure oil entering into the oil passage 73 when the valve stem 61 is moved upward and thus in operation this drain 66 exhausts a portion of the pressure increasing oil to the outside of the valve body 62 to reduce the pressure of the pressure increasing oil when the valve stem 61 is moved down into its closed position. The throttling drain 67 forms a passage for the oil remaining below the valve stem 64 and it provides resistance to the up and down motion of the valve stem 64, thereby ensuring a more perfect smoothing action. By varying the duration of the energizing and de-energizing times of the solenoid 50, that is, by varying the ratio of the valve open duration to the valve closing duration of the valve 60 or the time width of the recurrent pulses applied to the solenoid 50, it is possible to vary the pressure of the pressure increasing oil in the oil passage 73. And the smoothing valve stem 64 and the spring 65 smooth out the oil pressure changes of the pressure increasing oil. When the valve stem 61 is moved upward and the valve remains open, the pressure increasing oil acts in the lower chamber 30'' of the constant pressure valve 30 so that the actuating oil pressure of the oil delivered through the oil passage 72 is reduced to a value such as 4 Kg/cm². Thus, by varying the ratio between the valve open and closing durations of the valve 60, it is possible to deliver through the oil pressure 72 the pressure oil at a suitable actuating oil pressure which, in the previously mentioned case, ranges from 10 Kg/cm² to 4 Kg/cm². Here, it is to be noted that the smoothing valve stem 64 needs not be added of its addition is not required by all means. As for example, an elastic member hermetically sealed to contain an inert gas therein and adapted to contract its volume under the influence of oil under pressure may well serve the purpose.

The vehicle speed transducer 10 comprises, as shown in FIG. 3, a disk 11 connected to the output shaft 8 of the speed change gear and a sensor 12. The disk 11 is in the form of a toothed type having a number of teeth formed on the periphery thereof. The sensor 12 is composed of a magnet 14 having a winding 13 wound on the magnet 14, so that voltage is produced across the winding 13 by the leakage flux variations caused as the teeth on the disk 11 come close to and move away from the magnet 14. This voltage is obtained in the form of a pulse having a frequency corresponding to the number of revolutions of the speed change gear output shaft 8 multiplied by the number of teeth in the disk 11.

Of course, the vehicle speed transducer 10 is not limited to the type illustrated by way of example and any type of transducers may well serve the purpose of the present invention provided that it is capable of generating an electrical output corresponding to the output shaft revolutions.

A load detector 20 adapted to generate an electrical signal corresponding to the degree of depression of the accelerator pedal and representing the loading of the vehicle comprises, as shown in FIG. 4a, a potentiometer 23 whose slider 24 is mounted on some portion of a connecting rod 22 which links an accelerator pedal 21 with the engine throttle valve (not shown), so that the slider 24 slides over a resistor 25. One end of the resistor 25 is grounded, and a constant positive voltage is applied to the other end 26 of the resistor 25 so that the voltage developed across the slider 24 is taken at a terminal 27. With the construction just described, the depression of the accelerator pedal 21 in the direction indicated by an arrow $a$ causes the slider 24 of the potentiometer 23 to slide over the resistor 25, so that a DC voltage (signal) is developed across the terminal 27 whose value increases in proportion to the degree of depression of the accelerator pedal 21.

Alternatively, the load detector 20 may be constructed as shown in FIG. 4b wherein an arcuate slider 29 is mounted through an intermediary of an electrical insulation on a turning plate 28 which is moved by the reciprocating motion of a connecting rod 22 and one end of the arcuate slider 29 is connected to a terminal 26 to which is applied a constant positive DC voltage. Here, the arcuate slider 29 successively contacts individual resistors of a resistor assembly 30 consisting of a plurality of unit resistors connected in parallel. The unit resistors of the assembly 30 have their one ends connected in common to one end $b$ of a resistor 31 whose the other end is connected to the ground. Thus, the voltage applied between the terminal 26 and the ground is divided by the resistance values of the resistor assembly 30 and the resistor 31 so that the divided voltage appears across the terminal 27. With this construction, as the accelerator pedal 21 is depressed in the direction of an arrow $a$, the arcuate slider 29 rotates in the direction of an arrow $c$ so that a DC voltage (signal) is developed across the terminal 27 whose value increases successively in proportion to the degree of depression of the accelerator pedal 21.

In this connection, the load detector for generating an electrical signal corresponding to the vehicle load is not limited to the type just described which produces an electrical signal corresponding to the degree of depression of the accelerator pedal, and any means which produces an electrical signal corresponding to a value representing such as the engine throttle valve opening and the engine inlet manifold vacuum also comes within the scope of coverage of the present invention.

It is now evident from the foregoing that the actuating oil pressure control valve assembly shown in FIG. 2 is capable of continuously varying the actuating oil pressure of the pressure oil delivered to the oil passage 72 by varying the time width of the applied pulses when energizing the solenoid 50. Next, the construction of a first embodiment of the electrical control circuit incorporated in the system of the present system will be explained hereunder with reference to the electrical block diagram of FIG. 5.

In FIG. 5, numeral 10 designates a vehicle speed transducer; 20 a load detector; 110 a vehicle speed signal generator; 120 a differential amplifier; 130 a vehicle speed setting circuit; 150 a regulated power supply; 160 a sawtooth wave generator; 170 a comparator; 180 a power amplifier; 50 a solenoid.

The operation of this first embodiment electrical control circuit in the system of the present invention which is constructed as described above, will now be explained in detail by referring to the construction of each of the essential component circuits.

The output pulse signal of the vehicle speed transducer 10 having a frequency proportional to the vehicle speed, is applied through an output line 13 to the vehicle speed signal generator 110 in which the signal is converted into a DC voltage $K_s \cdot V_s$ (where $K_s$ is the proportional constant) and delivered on an output line 112. This vehicle speed signal generator 110 consists, for example, of an amplifier circuit for amplifying the output pulse signal of the vehicle speed transducer 10, an amplitude limiter for limiting the amplitude of the amplified pulse signal to a predetermined constant level and a frequency-DC voltage conversion circuit for generating a DC voltage proportional to the frequency of the amplitude limited pulse signal. It is a matter of course that any other constructions may be used for the purpose. And a vehicle speed detecting circuit is formed by the vehicle speed transducer 10 and the vehicle speed signal generator 110. The load detector 20 generates on an output line 27 an output voltage $K_\theta \cdot V_\theta$ ($K_\theta$ = proportional constant) corresponding to the loading of the vehicle such as the degree of depression of the accelerator pedal.

The differential amplifier 120 may be of the construction known in the art and no modification is required. It receives as the inputs the output voltage $K_\theta \cdot V_\theta$ of the load detector 20 and the output voltage $K_s \cdot V_s$ of the vehicle speed signal detector 110 to find the difference between the two voltages so that an output voltage representative of $K_\theta \cdot V_\theta - K_s \cdot V_s$ is produced on an output line 122. The amplifier 120 is so designed that it produces its output voltage only for the range of difference $K_\theta \cdot V_\theta \geq K_s \cdot V_s$, whereas no output voltage is produced for the range $K_\theta \cdot V_\theta < K_s \cdot V_s$.

The vehicle speed setting circuit 130 receives as its input the output voltage of the vehicle speed signal generator 110 and generates a constant DC voltage (a) on an output line 132 when the value of the received output voltage, i.e., the vehicle speed is almost above zero and exceeds the predetermined value. It consists of a conventional comparator circuit in which one of the two inputs has a value very close to zero and a resistance type voltage dividing circuit which devides the output voltage.

The operational amplifier 140 consists of conventional operational circuits arranged in two stages with the succeeding stage being adapted for code conversion. Its inputs are the output voltage of the differential amplifier 120 and the output voltage of the vehicle speed setting circuit 130, so that the two output voltages are added together to generate on a line 142 an output voltage representing $(K_\theta \cdot V_\theta - K_s \cdot V_s) + a$.

Any regulated power supply of the conventional construction may be used without modification for the regulated power supply 150 which is adapted to generate a constant DC voltage on an output line 152.

The sawtooth wave generator 160 receives as the input thereto the output voltage of the regulated power supply 150 and generates on an output line 162 a sawtooth voltage having a constant period. It consists of a conventional integrating circuit for integrating the output voltage of the regulated power supply 150 and a resetting circuit for resetting the integrating action of the integrating circuit to its original state before the initiation of the integration after a predetermined time ranging from 10 to 100 [msec], for example.

The inputs to the comparator 170 are the output sawtooth voltage of the sawtooth wave generator 160 and the output voltage (DC level) of the operational amplifier 140 and it compares the two voltages to produce a rectangular voltage of constant voltage on an output line 172 only when the former of the two input voltages is higher than the latter. Here, if the output voltage of the sawtooth wave generator 160 is given $(t_1/T_{AC})^V$ (where $t_1$ is the time required for the output voltage of the sawtooth wave generator 160 to rise from zero up to a value higher than the output voltage of the operational amplifier 140 by virtue of the integrating action of the integrating circuit in the former, $V$ is the output voltage of the regulated power supply 150, and $T_o$ is the time required for the integrating circuit of the sawtooth wave generator 160 to complete the integration), the following expressions result:

$$\frac{t_1}{T_0} V = K_\theta \cdot V_\theta - K_s \cdot V_s + a$$

$$\therefore t_1 = \left(\frac{K_\theta}{V} \cdot V_\theta - \frac{K_s}{V} \cdot V_s + \frac{a}{V}\right) \cdot T_0$$

Since the output voltage of the comparator 170 appears during the time interval $T_o - t_1$, a rectangular voltage having a time width $$T_0 - \left(\frac{K_\theta}{V} \cdot V_\theta - \frac{K_s}{V} \cdot V_s + \frac{a}{V}\right) \cdot T_0$$

is generated at period $T_o$ by the comparator 170 on the output line 172.

The power amplifier 180 may consist of any power amplifier of the conventional construction not requiring any modification, and it amplifies the output voltage of the comparator 170 to generate an output voltage on an output line 182.

The coil 52 of the solenoid 50 is energized for period of time equal to the time width of the output rectangular voltage of the comparator 170 which has been amplified by the power amplifier 180. Thus, an oil pressure proportional to $$T_0 - \left(\frac{K_\theta}{V} \cdot V_\theta - \frac{K_s}{V} \cdot V_s + \frac{a}{V}\right) \cdot T_0$$

is produced in the oil passage 73. Consequently, the actuating oil pressure P of the pressure oil delivered from the oil passage 72 of the constant pressure valve if the oil pressure P for the time interval $0 - t_1$ is given as $P_H$ and the oil pressure P for $T_o - t_1$ is given as $P_L$, then $$P = \frac{(T_0 - t_1) \cdot P_L + P_H \cdot t_1}{T_0} = P_L + \frac{(P_H - P_L)}{T_0} \cdot t_1$$

30 is controlled in proportion to $t_1/T_o$; that is, $$= P_L + (P_H - P_L) \left(\frac{K_\theta}{V} \cdot V_\theta - \frac{K_s}{V} \cdot V_s - \frac{a}{V}\right) = LV_\theta + MV_s + N$$

(1)

where $L$, $M$ and $N$ are constants. By assigning predetermined suitable valves to the constants $L$, $M$ and $N$ from the above-mentioned dual first order equation, the actuating oil pressure $P$ of the pressure oil supplied to the friction engaging means of the speed change gear 5 can be controlled at a value dependent on the value of the output voltage $K \cdot V$ of the load detector 20, i.e., the vehicle load and the output voltage $K_s \cdot V_s$ of the vehicle speed signal generator 110. In other words, when the vehicle is heavily loaded and the vehicle speed is low, the output voltage level of the operational amplifier 140 is high and the time width of the output rectangular voltage generated from the comparator 170 is small as will be determined from the above equation $$T_0 - \left(\frac{K_\theta}{V} \cdot V_\theta - \frac{K_s}{V} \cdot V_s + \frac{a}{V}\right) T_0$$

so that the ratio of the energization time of the coil 52 of the solenoid 50 is reduced. In the actuating oil pressure control valve assembly of FIG. 2, the ratio of time during which the valve stem 61 stays in its upper position is reduced with the resultant increase in the actuating oil pressure of the pressure oil supplied to the friction engaging means of the speed change gear 5 through the oil passage 72. Consequently, when the vehicle is loaded heavily and the vehicle speed is low so that the engine has a surplus horse power, the friction engaging means are strongly tightened. Whereas when the vehicle is not heavily loaded and the vehicle speed is high, contrary to the aforementioned case, the friction engaging means are tightened as sufficiently as needed so as to reduce on the whole the acceleration or deceleration between the propeller shaft and the engine output shaft as well as the loss of the driving force.

On the other hand, when the vehicle speed is zero and there is no loading on the vehicle as will be the case when the vehicle is at rest, the aforesaid Equation (1) is then given as $P = N$, that is, the Equation (1) is reduced only to the constant term of the $$V\left\{P_\text{L} + (P_\text{H} - P_\text{L}) \frac{a}{V}\right\}$$

and thus the pressure oil at the minimum actuating oil pressure given by the form $P = P_L$ (because $a = 0$) such as 4 Kg/cm² is applied to the friction engaging means. Furthermore, when the load is reduced to zero and the depression of the accelerator pedal is released while the vehicle is being driven (vehicle speed is not smaller than the predetermined value), the pressure oil is always supplied to the friction engaging means at a pressure of 5 Kg/cm², for example by assigning predetermined suitable value to the constant a. Then, the actuating oil pressure of the pressure oil supplied to the friction engaging means is controlled at a most suitable value ranging from the maximum value of 10 kg/cm² to the minimum value of 4 Kg/cm² depending on the speed and load of the vehicle.

The construction of a second embodiment of the electrical control circuit incorporated in the system of the present invention will be explained hereunder with reference to the electrical block diagram of FIG. 6. In this figure, numeral 10 designates a vehicle speed transducer; 20 a load detector; 110 a vehicle speed signal generator; 190 a sawtooth wave generator; 170 a comparator; 180 a power amplifier; 50 a solenoid.

In the discussion to follow, the operation of the second embodiment electrical control circuit with the arrangement described above will be explained by referring to the constructions of the various constituent circuits.

The output pulse signal generated from the vehicle speed transducer 10 and having a frequency proportional to the vehicle speed is applied via an output line 13 to the vehicle speed signal generator 110 where the pulse signal is converted into a signal $K_s \cdot V_s$ ($K_s$ = proportional constant) proportional to the vehicle speed and this DC output voltage (signal) is delivered along an output line 112. The vehicle speed signal generator 110 comprises, for example, an amplifier circuit for amplifying the output pulse signal of the vehicle speed transducer 10, an amplitude limiting circuit for limiting the amplitude of the amplified pulse signal to a predetermined constant level, and a frequency-DC voltage conversion circuit for generating a signal proportional to the frequency of the amplitude limited pulse signal. Of course, other alternative circuit constructions may be used. And a vehicle speed detecting circuit is formed by the vehicle speed transducer 10 and the vehicle speed signal generator 110.

The load detector 20 generates on an output line 27 an output signal $K \cdot V$ ($K$ = proportional constant) corresponding to the vehicle load such as the degree of depression of the accelerator pedal.

The sawtooth wave generator 190 receives as the input thereto the output voltage of the vehicle speed signal generator 110 and generates a sawtooth voltage having a constant period on an output line 192. This generator 190 comprises an integrating circuit for integrating the output signal of the vehicle signal generator 110 (if this integration requires to reverse the phase of the output signal of the vehicle speed signal generator 110, a phase inverter circuit will be incorporated), and a resetting circuit for restoring the integrating action of the integrating circuit to the original state before the initiation of the integration after a predetermined time ranging from 10 to 100 [msec], for example, so that a signal $(T/T_o) \cdot K' \cdot K_s \cdot V_s$ is produced at the output for the input $K_s \cdot V_s$, where $T_o$ is the time required for the sawtooth wave generator 190 to complete the integration, $T$ is the time elapsed since the integration is initiated, and $K'$ is the proportional constant.

One of the two inputs to the comparator 170 is the sum signal of the sawtooth signal from the sawtooth wave generator 190 and the signal from the vehicle speed signal generator 110 and the other input is the output signal from the load detector 20, so that a constant voltage rectangular signal (voltage) is produced on an output line 172 only when the comparison between the two input signals indicates that the former is higher than the latter. Here, the output signal of the sawtooth wave generator 190 is $(t_1/T_o) \cdot K' \cdot K_s \cdot V_s$ (where $t_1$ is the time required for the output signal of the sawtooth wave generator 190 to rise, by virtue of the integrating action of its integrating circuit, from zero up to a point where its sum signal with the output signal of the vehicle speed signal generator 110 becomes higher then the output signal of the load detector 20), and $T_o$ is assumed to indicate the time required for the integrating circuit of the sawtooth wave generator 190 to complete the integration as stated above, then the following expressions result:

$$\frac{t_1}{T_0} \cdot K' \cdot K_s \cdot V_s + K_s \cdot V_s = K_\theta \cdot V_\theta$$

$$\therefore t_1 = \left[ \frac{K_\theta \cdot V_\theta}{K' \cdot K_s \cdot V_s} - \frac{1}{K'} \right] \cdot T_0$$

Thus, if the circuit is so arranged that a low voltage (hereinafter the low voltage is coded to represent 0 and the high voltage 1) signal appears at the output of the comparator 170 during the time interval $t_1$, a rectangular voltage having a time width $t_0 - t_1$ is generated at a period $t_0$ on the line 172 by the comparator 170.

For the power amplifier 180, any power amplifier of the conventional construction may be employed without any modification, and its function is to amplify the output signal of the comparator 170 to generate an output signal on an output line 182.

The solenoid 50 is energized for a period of time corresponding to the time width of the output rectangular signal of the comparator 170 which has been amplified by the power amplifier 180.

Consequently, the actuating oil pressure P of the pressure oil delivered via the oil passage 72 of the constant pressure valve 30 is controlled in proportion to $t_1/T_{oa}$.

Assuming that $P_H$ (maximum) represents the actuating oil pressure when the solenoid 50 is deenergized and $P_L$ (minimum) represents the actuating oil pressure when the solenoid is energized, then the average value of the actuating oil pressure P is given as $$P = \frac{P_H t_1 + P_L(T_0 - T_1)}{T_0} = P_L \frac{P_H - P_L}{T_0} \cdot t_1$$

substituting the above equation of $t_1$ into this equation gives $$P = P_L + (P_H - P_L)\left(\frac{K_\theta \cdot V_\theta}{K' \cdot K_s \cdot V_s} - \frac{1}{K'}\right) = L \frac{V_\theta}{V_s} - M \quad (2)$$

where L and M are constants. By assigning predetermined suitable values to the constants L and M from the above second order equation, the actuating oil pressure of the pressure oil supplied to the friction engaging means of the speed change gear 5 can be controlled at a value dependent upon the value of the output signal $K_\theta \cdot V_\theta$ of the load detector 20, i.e., the vehicle load and the output signal $K_s \cdot V_s$ of the vehicle speed signal detector 110, i.e., the vehicle speed. This mode of control will now be explained with reference to FIG. 7 in which the ordinate represents the actuating oil pressure P and the abscissa represents the vehicle speed $V_s$ with the vehicle load $V_\theta$ being the parameter. In other words, when the vehicle is under heavy load and the vehicle speed is low, the time width of the output rectangular voltage generated by the comparator 170 is reduced as will be determined from the aforesaid form $$T_0 - \left(\frac{K_\theta}{K' \cdot K_s} \frac{V_\theta}{V_s} - \frac{1}{K'}\right) \cdot T_0$$

so that the ratio of the energization time of the solenoid 50 is reduced. Consequently, in the actuating oil pressure control valve assembly shown in FIG. 2, the ratio of time during which the valve stem 61 remains in its upward position is decreased with the result that the pressure of the pressure increasing oil in the oil passage 73 is reduced to thereby increase the actuating oil pressure of the pressure oil supplied to the friction engaging means of the speed change gear 5. Thus, when the vehicle is under heavy load and the vehicle speed is low the friction engaging means are applied to tighten heavily, while on the contrary the friction engaging means are applied to tighten lightly when the vehicle is lightly loaded and the vehicle speed is high.

It is now evident that the actuating oil pressure of the pressure oil supplied to the friction engaging means can be controlled at a most suitable value between the maximum pressure of 10 Kg/cm² and the minimum pressure of 4 Kg/cm² depending upon the speed and load of the vehicle.

Next, the construction of a third embodiment of the electrical control circuit incorporated in the system of the present invention will be explained with reference to the electrical block diagram of FIG. 8.

Figure 8:
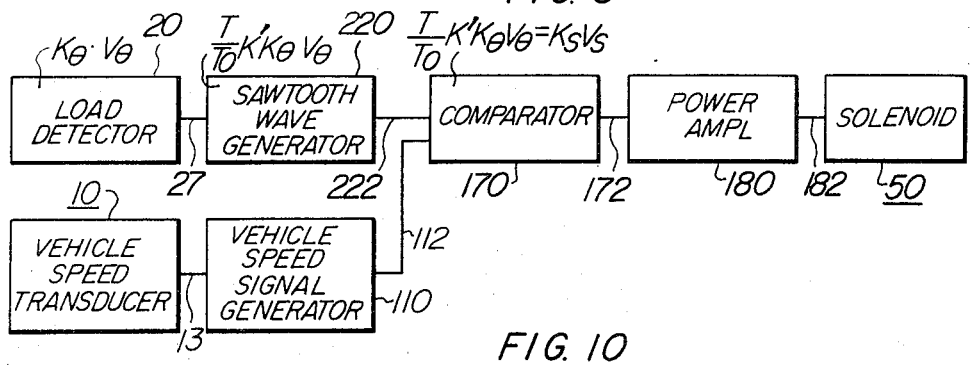
FIG. 8 is a block diagram showing a third embodiment of the electrical control system incorporated in the system of the present invention.

In FIG. 8, numeral 10 designates a vehicle speed transducer; 20 a load detector; 110 a vehicle speed signal generator; 220 a sawtooth wave generator; 170 a comparator; 180 a power amplifier; 50 a solenoid.

The operation of this third embodiment electrical control circuit with the above described component units will be explained hereunder by referring to the constructions of the individual component circuits.

The output pulse signal from the vehicle speed transducer 10 has a frequency proportional to the vehicle speed and is applied through an output line 13 to the vehicle speed signal generator 110 where it is converted to a signal $K_s \cdot V_s$ ($K_s$ = proportional constant) and this DC output voltage is delivered on an output line 112. The vehicle speed signal generator 110 comprises, for example, an amplifier circuit for amplifying the output pulse signal of the vehicle speed transducer 10, an amplitude limiting circuit for limiting the amplitude of the amplified pulse signal to a preselected constant level and a frequency-DC voltage conversion circuit for generating a signal proportional to the frequency of the amplitude limited pulse signal. It is needless to say that any alternative constructions may also be employed. And a vehicle speed detecting circuit is formed by the vehicle speed transducer 10 and the vehicle speed signal generator 110.

The load detector 20 generates on an output line 27 an output signal $K_\theta \cdot V_\theta$ ($K_\theta$ = proportional constant) corresponding to the load of the vehicle such as the degree of depression of the accelerator pedal.

The input to the sawtooth wave generator 220 is the output voltage of the load detector 20 and it generates a sawtooth voltage having a constant period on an output line 222. The generator 220 comprises an integrating circuit for integrating the output signal of the load detector 20 (if it is necessarily to reverse the phase of the output signal of the load detector, a phase inverter circuit will be added) and a resetting circuit for restoring the integrating action of the integrating circuit to the original state before the initiation of integration after a predetermined time of between 10 and 100 [msec] , so that an output $(T/T_o) \cdot K' \cdot K_\theta \cdot V_\theta$ (where T is the time elapsed since the initiation of the integration) is generated for the input $K_\theta \cdot V_\theta$ on the output line 222.

The comparator 170 receives its two inputs in the form of the sawtooth signal from the sawtooth wave generator 220 and the signal from the vehicle speed signal generator 110 and compares the two signals to generate two voltage levels of high and low, the low voltage being generated when the former of the two signals is lower than the latter and the high voltage being generated when the former is higher than the latter. The high voltage will be coded hereinafter to correspond to 1 and the low voltage to 0. The repetition of the process at a constant period causes the comparator 170 to produce its output in the form of rectangular waves. Here, the output voltage of the sawtooth wave generator 220 is given as $t_1 \cdot K_\theta \cdot V_\theta$ ($t_1$ is the time required for the output signal of the sawtooth wave generator 220 to build up, by virtue of the integrating action of its integrating circuit, from zero to a point where it becomes equal to the output signal of the vehicle speed signal generator 110) and if it is assumed that $T_o$ represents the time required for the integrating circuit of the sawtooth wave generator 220 to complete the integration, then the following expressions result:

$$\frac{t_1}{T_0} \cdot K' \cdot K_\theta \cdot V_\theta = K_s \cdot V_s \therefore t_1 = \frac{K_s \cdot V_s}{K' \cdot K_\theta \cdot V_\theta} \cdot T_0 \quad (3)$$

If the circuit is so arranged that the output signal of the comparator 170 is at 1 during the time interval $T_o - t_1$, a rectangular voltage having a time width $T_0 - \frac{K_s \cdot V_s}{K' \cdot K_\theta \cdot V_\theta} \cdot T_0 = T_0 \left(1 - \frac{K_s \cdot V_s}{K' \cdot K_\theta \cdot V_\theta}\right)$ is generated at a period $T_o$ from the comparator 170 on an output line 172.

The power amplifier 180 may consist of any power amplifier of the conventional construction requiring on modification. In this case, however, the polarity of the output of the comparator 170 is reversed so that it is amplified and then delivered on an output line 182 as the output signal.

The solenoid 50 is adapted to be energized for the time interval $t_1$ which corresponds with the time interval during which the output rectangular signal generated by the comparator 170 and amplified by the power amplifier 180 is at 0.

Assuming that the actuating oil pressure $P$ of the pressure oil delivered from the oil passage 72 of the constant pressure valve 30 is controlled in proportion to $(t_1/T_0)$, that is, if the oil pressure $P$ for the time interval $0 - t_1$ is given as $P_H$ and the oil pressure $P$ for $T_0 - t_1$ is given as $P_L$, then $$P = \frac{(T_0 - t_1) \cdot P_L + P_H \cdot t_1}{T_0} = P_L + \frac{(P_H - P_L)}{T_0} \cdot t_1 \quad (4)$$

Substituting this into the above Equation (3) gives $$P = P_L - \frac{(P_H - P_L)}{T_0} \times T_0 \frac{K_s}{K_\theta \cdot V_\theta} \cdot V_s = L - M \cdot \frac{1}{V_\theta} \cdot V_s \quad (5)$$

where $L$ and $M$ are constants.

Figure 9:
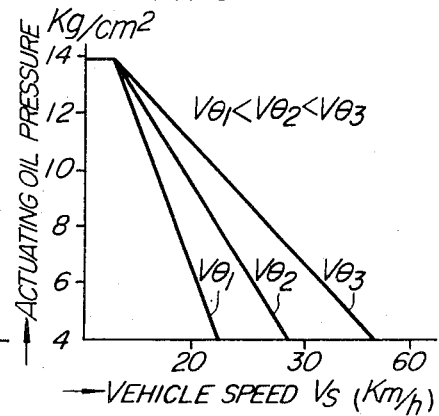
FIG. 9 is a characteristic diagram showing the relationship between the actuating oil pressure for the torque converter and the vehicle speed in the system of the present invention with the vehicle load being the parameter.

By assigning predetermined suitable values to the constants $L$ and $M$ in the Equation (5), the actuating oil pressure $P$ of the pressure oil supplied to the friction engaging means of the speed change gear 5 can be linearly controlled at a value dependent upon the value of the output signal $K_s \cdot V_s$ of the vehicle speed signal generator 110, i.e., the vehicle speed, with the value of the output signal $K \cdot V$ of the load detector 20, i.e., the vehicle load being the parameter. In other words, when the vehicle is under heavy load and the vehicle speed is low, the time width of the output rectangular voltage generated by the comparator 170 is increased as will be determined from the above form $$T_0 \left(1 - \frac{K_s \cdot V_s}{K' \cdot K_\theta \cdot V_\theta}\right)$$

so that the ratio of the energization time of the solenoid 50 is decreased. Consequently, in the actuating oil pressure control valve assembly shown in FIG. 2, the ratio of time that the valve stem 61 remains in its upward position is reduced so that the pressure of the pressure increasing oil in the oil passage 73 decreases with the resultant increase in the actuating oil pressure of the pressure oil supplied to the friction engaging means of the speed change gear 5. Thus, when the vehicle is under heavy load and the vehicle speed is low the friction engaging means are applied to strongly tighten, and the friction engaging means are applied to tighten lightly in contrast to the first case when the vehicle is under light load and the vehicle speed is high. This mode of control is shown in FIG. 9 in which the ordinate represents the actuating oil pressure P and the abscissa represents the vehicle speed $V_s$ with the vehicle load $V_\theta$ being the parameter. With the vehicle load being maintained constant, the actuating oil pressure decreases as the vehicle speed increases, whereas the actuating oil pressure increases as the vehicle load increases when the vehicle speed is held constant. In this case, the maximum actuating oil pressure $P_H$ is preset to 14 Kg/cm² and the minimum actuating oil pressure to 4 Kg/cm². It is now evident that the actuating oil pressure of the pressure oil supplied to the friction engaging means can be controlled at a most suitable value between the maximum pressure of 14 Kg/cm² and the minimum pressure of 4 Kg/cm² depending upon the speed and load of the vehicle.

Figure 10:
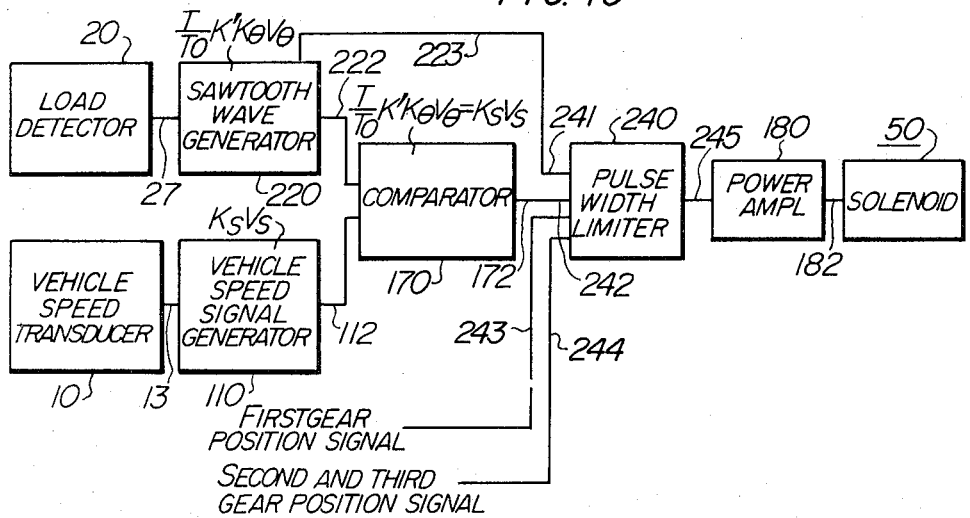
FIG. 10 is a block diagram showing a fourth embodiment of the electrical control system in the system of the present invention.

Referring now to the electrical block diagram of FIG. 10, the construction of a fourth embodiment of the electrical control circuit incorporated in the system of the present invention will be explained hereunder. In FIG. 10, numeral 10 designates a vehicle speed transducer; 20 a load detector; 110 a vehicle speed signal generator; 220 a sawtooth wave generator; 170 a comparator; 240 a pulse width limiter; 180 a power amplifier; 50 a solenoid.

Next, the operation of this fourth embodiment electrical control circuit with the component units described above will be explained by referring to the constructions of the various constituent circuits.

The output pulse signal from the vehicle speed transducer 10 has a frequency proportional to the vehicle speed and is applied through an output line 13 to the vehicle speed signal generator 110 where it is converted to a signal $K_s \cdot V_s$ ($K_s$ = proportional constant) proportional to the vehicle speed and this DC output voltage (signal) is provided on an output line 112. The vehicle speed signal generator 110 comprises, for example, an amplifier circuit for amplifying the output pulse signal of the vehicle speed transducer 10, an amplitude limiting circuit for limiting the amplitude of the amplified signal to a predetermined constant level and a frequency-DC voltage conversion circuit for generating a signal proportional to the frequency of the amplitude limited pulse signal. Of course, any alternative construction may be used as well. And a vehicle speed detecting circuit is formed by the vehicle speed transducer 10 and the vehicle speed signal generator 110.

The function of the load detector 20 is to generate an output signal $K_\theta \cdot V_\theta$ ($K_\theta$ = proportional constant) corresponding to the loading of the vehicle such as the degree of depression of the accelerator pedal.

The sawtooth wave generator 220 receives as the input thereto the output voltage of the load detector 20 and generates on an output line 222 a sawtooth voltage having a constant period. And this circuit comprises an integrating circuit for integrating the output voltage of the load detector 20 and it may include a phase inverter circuit where it is necessary to reverse the phase of the output signal of the load detector 20 for effecting the integration.

The sawtooth wave generator 220 also includes a resetting circuit for restoring the integrating action of its integrating circuit to the original state before the integration after a predetermined time interval ranging from 10 to 100 msec, for example, so that a signal $(T/T_o) \cdot K' \cdot K_\theta \cdot V_\theta$ (where $T$ is the time elapsed since the initiation of the integration) appears at the output for the input of $K_\theta \cdot V_\theta$.

The comparator 170 receives its two inputs in the form of the sawtooth signal from the sawtooth wave generator 220 and the output signal from the vehicle speed signal generator 110, so that the two signals are compared to generate a low voltage when the former signal has a lower value than the latter and a high voltage when the former signal has a higher value than the latter. The higher voltage will be coded hereinafter to be identified with 1 and the lower voltage with 0. The repetition of this process at a constant period causes the comparator 170 to produce its output in the form of rectangular waves. Here, the output signal of the sawtooth wave generator 220 is represented by $(t_1/T_o) \cdot K' \cdot K_\theta \cdot V_\theta$ (where $t_1$ is the time required for the output signal of the sawtooth wave generator 220 to rise, by virtue of the integrating action of the integrating circuit, from zero up to a point where it becomes equal to the output signal of the vehicle speed signal generator 110), so that $t_1$ is given by the following equation:

$$\frac{t_1}{T_0} \cdot K' \cdot K_\theta \cdot V_\theta = K_s \cdot V_s \therefore t_1 = \frac{K_s \cdot V_s}{K' \cdot K_\theta \cdot V_\theta} \cdot T_0 \qquad (6)$$

Assuming that $T_o$ represents the time required for the integrating circuit of the sawtooth wave generator 220 to complete the integration and if the circuit is so arranged that the output signal of the comparator 170 is at 1 during the time interval $T_o - t_1$, a rectangular voltage having a time width $$T_0 \left(1 - \frac{K_s \cdot V_s}{K' \cdot K_\theta \cdot V_\theta}\right) \text{ is}$$

generated at a period $T_o$ from the comparator 170 on an output line 172. On the other hand, another signal having the period $T_o$ is applied to an input line 241 of the pulse width limiter 240 through an output line 223 of the sawtooth wave generator 220.

Figure 11:
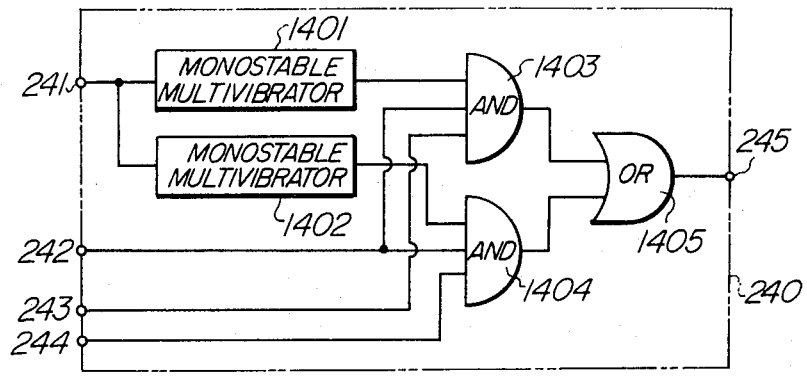
FIG. 11 is an electrical block diagram of the pulse width limiting circuit in the block diagram of FIG. 10.
Figures 12A, 12B:
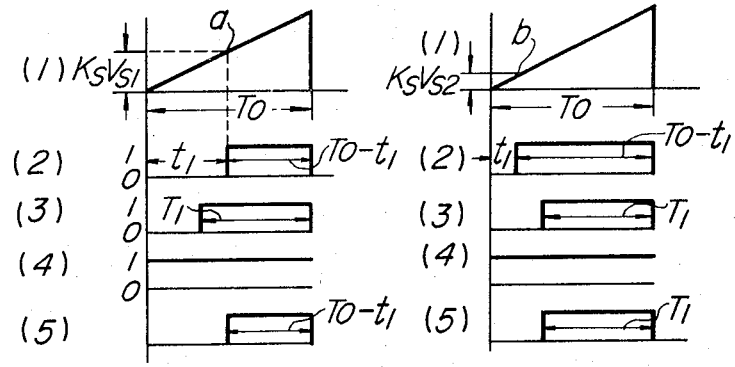
FIG. 12a and FIG. 12b are diagrams for explaining the operation of the circuit shown in FIG. 11.

The function of the pulse width limiter 240 is to limit the pulse width such that the actuating oil pressure will not exceed 10 Kg/cm² in the first gear position and 8 Kg/cm² in the second gear position. FIG. 11 shows the electrical block diagram of the circuit in which numerals 1401 and 1402 designate monostable multivibrators and numerals 1403 and 1404 designate AND circuits. The input line 241 to the monostable multivibrators 1401 and 1402 is connected to the output line 223 of the sawtooth wave generator 220. The three inputs to the AND circuit 1401 are the output of the monostable multivibrator 1401, the signal applied to an input line 243 from the output line 172 of the comparator 170 and a first gear position signal introduced at an input line 243, while the three inputs to the AND circuit 1402 include the output of the monostable multivibrator 1402, the signal applied to the input line 242 from the output line 172 of the comparator 170 and a second gear position signal introduced at an input line 244. The outputs of the AND circuits 1403 and 1404 are applied to the two inputs of an OR circuit 1405, respectively. The output of the OR circuit 1405 is taken at an output line 245 of the pulse width limiter 240. The operating conditions are shown in FIGS. 12a and 12b. FIG. 12a illustrates the operating conditions of the circuit in the first gear position with the pulse width not being limited, and FIG. 12b shows the conditions with the pulse width being limited.

In FIGS. 12a and 12b, (1) is the output signal on the output line 222 of the sawtooth wave generator 220, a point $a$ indicates where the output signal of the vehicle speed signal generator 110 is $K_s \cdot V_{s1}(V)$ and a point $b$ indicates where the signal is $K_s \cdot V_{s2}(V)$. (2) is the output signal on the output line 172 of the comparator 170 with $t_1$ representing the duration time of the 0 signal and the duration time of the 1 signal is given by $T_o - t_1$. (3) is the output signal of the monostable multivibrator 1401 which sets up oscillations at a constant period upon application thereto of a trigger pulse from the output line 223 of the sawtooth wave generator 220. (4) is the first gear position signal which is the 1 signal, however, it will be the 0 except for the first gear position. (5) is the output signal on the output line 245 of the pulse width limiter 240. In the first gear position, when the output pulse width $T_o - t_1$ is less than the output pulse width $T_1$ of the monostable multivibrator 1401, a pulse having a pulse width $T_o - t_1$ (FIG. 12a) appears at the output of the AND circuit 1403. Since the output of the AND circuit 1404 is the 0 signal in the first gear position, a pulse whose pulse width is $T_o - t_1$ appears on the output line of the OR circuit 1405, i.e., the output line 245 of the pulse width limiter 240. On the other hand, when the output pulse width $T_o - t_1$ of the comparator 170 is greater than the output pulse width $T_1$ of the monostable multivibrator 1401, a pulse having a pulse width $T_1$ (FIG. 12b) appears at the output of the AND circuit 1403. Then, the pulse whose pulse width is $T_1$ is produced on the output line of the OR circuit 1405, i.e., the output line 245 of the pulse width limiter 240. In this case, the pulse width $T_o - t_1$ varies in accordance with the load and speed of the vehicle as stated hereinbefore, and the pulse width $T_1$ is always constant because it is the width of the output pulse generated by the monostable multivibrator 1401. If the value of $T_1$ is selected such that the actuating oil pressure is maintained at 10 Kg/cm² in the presence of a pulse having the pulse width $T_1$, depending on the vehicle speed and using the vehicle load as the parameter, the actuating oil pressure is determined by the functional relation between the time $t$, i.e., the pulse width $T_o - t_1$ and the actuating oil pressure P from the Equation (1). In the case of the first speed gear position, the actuating oil pressure is unconditionally regulated at 10 kg/cm² whenever the calculation based on the load and speed of the vehicle represents an actuating oil pressure above 10 Kg/cm².

Similarly, in the second and third gear positions the monostable multivibrator 1402 and the AND circuit 1404 come into action. Assuming that the output pulse width of the monostable multivibrator 1402 is $T_2$ (m-sec), a pulse of width $T_o - t_1$ appears at the output of the AND circuit 1404 whenever the pulse width $T_o - t_1$ of the pulse signal generated on the output line 172 of the comparator 170 is less than $T_2$. In other words, the pulse of the width $T_o - t_1$ is developed at the output line 245 of the pulse width limiter 240. On the contrary, when the pulse width $T_o - t_1$ is greater than $T_2$, a pulse having the pulse width $T_2$ is developed at the output of the AND circuit 1404 so that the pulse of the width $T_2$ appears on the output line 245 of the pulse width limiter 240. Here, if the value of $T_2$ is selected such that the actuating oil pressure is regulated at 8 Kg/cm² when there is the pulse of the width $T_2$, the actuating oil pressure is unconditionally controlled at 8 Kg/cm² whenever the calculation based on the load and speed of the vehicle in the second and third gear positions represents an actuating oil pressure above 8 Kg/cm². Although the identical pressure is employed for both the second and third gear positions, different actuating oil pressures may be employed for the second and third gear positions respectively. For example, if it is desired to control the actuating oil pressure below 8 Kg/cm² for the second gear and below 6 Kg/cm² for the third gear position, an additional set of a monostable multivibrator and an AND circuit may be incorporated and at the same time the inputs to the OR circuit 1405 may be increased to three terminals. Furthermore, if there is no need to limit the actuating oil pressure in the first gear position, but it must be limited only for the second and higher gear positions, the monostable multivibrator 1401 and the AND circuit 1403 may be dispensed with.

The power amplifier 180 may consist of any power amplifier of the conventional construction requiring no modification and it amplifies the output signal of the pulse width limiter 240 to produce an output signal on an output line 182. In this case, the phase relation is such that the solenoid 50 is de-energized when the output signal of the pulse width limiter 240 is at 1 and the solenoid 50 is energized when the output signal is at 0. The solenoid 50 operates in the conventional manner and therefore it will not be explained further.

Now, the relationship between the energization and de-energization of the solenoid 50 and the actuating oil pressure P in the hydraulic circuit will be explained. When the vehicle is under heavy load and the vehicle speed is low, as explained hereinbefore, the time width $T_o - t_1$ of the output rectangular voltage generated by the comparator 170 is given as $$T_0 \left(1 - \frac{K_s \cdot V_s}{K' \cdot K_\theta \cdot V_0}\right) \text{ and}$$

thus it is increased with the resultant decrease in the ratio of the energizing time of the solenoid 50. This reduces the ratio of time during which the valve stem 61 remains in its upward position in the actuating oil pressure control valve assembly of FIG. 2, so that the pressure of the pressure increasing oil in the oil passage 73 is reduced thereby increasing the actuating oil pressure of the pressure oil supplied to the friction engaging means of the speed change gear 5. Consequently, when the vehicle is under heavy load and the vehicle speed is low the friction engaging means are applied to tighten heavily, while on the other hand the friction engaging means are applied to tighten moderately when the vehicle is under light load and the vehicle speed is high. It will be seen from the Equation (6) that there is a linear functional relation between the time $t_1$ and the vehicle speed with the vehicle load being the parameter. Thus, assuming that there is a linear functional relation between the actuating oil pressure P of the pressure oil delivered through the oil passage 72 of the constant pressure valve 30 by virtue of the solenoid 50 and $t_1$, and that $P_H$ represents the oil pressure for $0 \sim t_1$ and $P_L$ represents the oil pressure for $t_1 \sim T_0$, the average actuating oil pressure P produced by the repeated energization and de-energization of the solenoid 50 is given $$P = \frac{(T_0 - t_1) \cdot P_L + P_H \cdot t_1}{T_0} = P_L + \frac{(P_H - P_L)}{T_0} \cdot t_1 \quad (7)$$

Substituting this into the Equation (6) results $$P = P_L + \frac{(P_H - P_L) \cdot K_s}{K' \cdot K_\theta \cdot V_0} \cdot V_s \quad (8)$$

Figure 13:
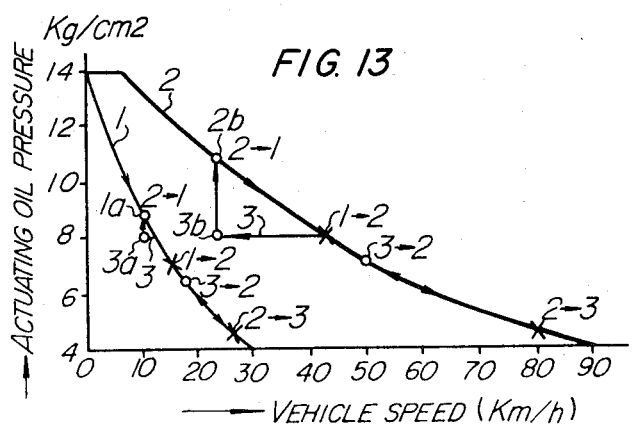
FIG. 13 is a characteristic diagram showing the relationship between the actuating oil pressure for the torque converter and the vehicle speed in the system of the present invention with the vehicle load being the parameter.

As will be seen from the Equation (8), there is the linear relation between the actuating oil pressure P and the vehicle speed $V_s$ with the vehicle load being the parameter, and the relationship as shown in FIG. 13 has been found in the above described embodiment of the present invention. In FIG. 13, the curve 1 represents the characteristics of the actuating oil pressure P and the vehicle speed $V_s$ for the idle throttle (the accelerator pedal is released) and the curve 2 represents the characteristics of the actuating oil pressure P and the vehicle speed $V_s$ for the full throttle (the accelerator pedal is fully depressed), whereas those characteristics for other throttle positions lie in the region between the curves 1 and 2. The straight line 3 represents the case where the pulse width limiter 240 is employed to prevent the actuating oil pressure from exceeding 8 Kg/cm² in the second gear position. Where the pulse width limiter 240 is not introduced, the shift point from the second to the first gear for the idle throttle is at a point 1a and the oil under 8.4 Kg/cm² is available at this instance, whereas a point 2b represents the shift point from the second to the first gear for the full throttle and the oil pressure at this point is 10.4 Kg/cm². On the other hand, the introduction of the pulse width limiter 240 causes the point 1a and 2b to move to points 3a and 3b, respectively, and the oil pressure is maintained at 8.0 Kg/cm² for the second gear in both cases. Then, as the gear is changed to the first gear, the original conditions are restored. In FIG. 13, the letters 1 → 2, 2 → 3 designate the upshift points from the first to the second gear and from the second to the third gear, respectively, whereas the downshift points from the second to the first gear and from the third to the second gear are designated by 2 → 1 and 3 → 2, respectively.

What is claimed is:

1. An actuating oil pressure control system for a torque converter automatic transmission including a torque converter, speed change gears with friction engaging means, and a hydraulic actuation circuit provided for supplying oil under pressure to said friction engaging means of said speed change gears so as to effect automatic gear changes, said actuating oil pressure control system comprising:
a vehicle speed detecting circuit for generating an electrical voltage signal corresponding to the vehicle speed;
a load detecting circuit for generating an electrical voltage signal corresponding to the vehicle load;
an operational circuit connected with said two detecting circuits for generating an output voltage due to the output voltage signals from said two detecting circuits;
a sawtooth wave generating circuit for generating a sawtooth voltage of a constant period;
a comparator circuit connected with said sawtooth wave generating circuit and said operational circuit for comparing the sawtooth voltage of said sawtooth wave generating circuit with the output voltage of said operational circuit and generating a rectangular voltage; and
means connected with said comparator circuit for varying the actuating oil pressure of said oil under pressure supplied to said friction engaging means in accordance with the output rectangular voltage of said comparator circuit, whereby said actuating oil pressure is controlled in accordance with variations in the time width of the output rectangular voltage of said comparator circuit.

2. An actuating oil pressure control system for a torque converter automatic transmission according to claim 1 wherein said operational circuit comprises a vehicle speed setting circuit connected with said vehicle speed detecting circuit for generating a constant voltage when the value of said electrical voltage signal from said vehicle speed detecting circuit exceeds a predetermined one; a differential amplifier connected with said load detecting circuit and said vehicle speed detecting circuit for generating an output voltage representing the difference between the two electrical voltage signals from said two detecting circuits; and an operational amplifier connected with said vehicle speed setting circuit and said differential amplifier for generating said output voltage representing the sum of the output voltage from said differential amplifier and the constant voltage from said vehicle speed setting circuit.

3. An actuating oil pressure control system for a torque converter automatic transmission according to claim 1 wherein said means for varying the actuating oil pressure of the oil under pressure supplied to said friction engaging means comprises a pressure increasing valve for generating a unidirectional pressure increasing oil variable in response to the output rectangular voltage of said comparator circuit, and a constant pressure valve responsive to said unidirectional pressure increasing oil from said pressure increasing valve to vary the pressure setting of the actuating oil pressure.

4. An actuating oil pressure control system for a torque converter automatic transmission including a torque converter, speed change gears with friction engaging means, and a hydraulic actuation circuit provided for supplying oil under pressure to said friction engaging means of said speed change gears so as to effect automatic gear changes, said actuating oil pressure control system comprising:
a vehicle speed signal generating circuit for generating an electrical voltage signal corresponding to the vehicle speed;
a sawtooth wave generating circuit connected with said vehicle speed signal generating circuit for integrating at a constant period the electrical voltage signal of said vehicle speed generating circuit and generating a sawtooth wave voltage signal;
a load detecting circuit for generating an electrical voltage signal corresponding to the vehicle load;
add means connected with said vehicle speed signal generating circuit and said sawtooth wave generating circuit for adding the electrical voltage from said vehicle speed signal circuit and the sawtooth wave voltage signal and generating an output voltage;
a comparator circuit connected with said add means and said load detecting circuit for comparing the sawtooth wave voltage signal with the electrical voltage signal from said load detecting circuit and generating an output rectangular signal; and
means connected with said comparator circuit for varying the actuating oil pressure of the oil under pressure supplied to said friction engaging means in response to the output rectangular signal of said comparator circuit, whereby said actuating oil pressure is controlled in accordance with variations in the time width of the output rectangular signal of said comparator circuit.

5. An actuating oil pressure control system for a torque converter automatic transmission according to claim 4 wherein said means for varying the actuating oil pressure of the oil under pressure supplied to said friction engaging means comprises a pressure increasing valve for generating a unidirectional pressure increasing oil variable in response to the output rectangular signal of said comparator circuit, and a constant pressure valve for varying the pressure setting of the actuating oil pressure in response to said unidirectional pressure increasing oil from said pressure increasing valve.

6. An actuating oil pressure control system for a torque converter automatic transmission including a torque converter, speed change gears with friction engaging means, and a hydraulic actuation circuit provided for supplying oil under pressure to said friction engaging means of said speed change gears so as to effect automatic gear changes, said actuating oil pressure control system comprising:
a vehicle speed signal generating circuit for generating an electrical voltage signal corresponding to the vehicle speed;
a load detecting circuit for generating an electrical voltage signal corresponding to the vehicle load;
a sawtooth wave generating circuit connected with said load detecting circuit at a constant period and generating a sawtooth wave voltage signal;
a comparator circuit connected with said sawtooth wave generating circuit and said vehicle speed signal generating circuit for comparing the sawtooth wave voltage signal from said sawtooth wave generating circuit with the electrical voltage signal from said vehicle speed generating circuit and generating an output rectangular signal; and means connected with said comparator circuit for varying the actuating oil pressure of the oil under pressure supplied to said friction engaging means in response to the output rectangular signal of said comparator circuit, whereby said actuating oil pressure is controlled in accordance with variations in the time width of the output rectangular signal of said comparator circuit.

7. An actuating oil pressure control system for a torque converter automatic transmission according to claim 6 wherein said means for varying the actuating oil pressure of the oil under pressure supplied to said friction engaging means comprises a pressure increasing valve for generating a unidirectional pressure increasing oil variable in response to the output rectangular signal of said comparator circuit, and a constant pressure valve for varying the pressure setting of the actuating oil pressure in response to said unidirectional pressure increasing oil from said pressure increasing valve, whereby said actuating oil pressure is controlled in accordance with variation in the time width of the output rectangular signal of said comparator circuit.

8. An actuating oil pressure control system for a torque converter automatic transmission including a torque converter, speed change gears with friction engaging means, for changing said gears to any one of a plurality of relative positions and a hydraulic actuation circuit provided for supplying oil under pressure to said friction engaging means of said speed change gear, said actuating oil pressure control system comprising:

a vehicle speed detecting circuit for generating an electrical voltage signal corresponding to the vehicle speed;

a load detecting circuit for generating an electrical voltage signal corresponding to the vehicle load;

a sawtooth wave generating circuit connected with said load detecting circuit for integrating at a constant period said electrical voltage signal of said load detecting circuit and generating a sawtooth wave voltage signal;

a comparator connected with said sawtooth wave generating circuit and said vehicle speed signal generating circuit for comparing the sawtooth wave voltage signal from said sawtooth wave generating circuit with the electrical voltage signal from said vehicle speed generating circuit and generating an output rectangular signal;

a gear position signal generating circuit for generating signals indicating each position of said speed change gears;

a pulse width limiting circuit connected with said sawtooth wave generating circuit, said comparator and said gear position signal generating circuit for limiting the pulse width of the output rectangular signal of said comparator to a respective one of a plurality of widths corresponding to the instant position of said speed change gears; and means connected in circuit with said pulse width limiting circuit for varying the actuating oil pressure of the oil under pressure supplied to said friction engaging means in response to the output rectangular signal of said pulse width limiting circuit, whereby said actuating oil pressure is controlled in accordance with variations in the pulse width of the output rectangular signal of said pulse width limiting circuit.

9. An actuating oil pressure control system for a torque converter automatic transmission according to claim 8 wherein said pulse width limiting circuit comprises at least a monostable multivibrator connected with said sawtooth wave generating circuit for generating an output voltage having a constant time width and at least an AND circuit connected with said monostable multivibrator, said comparator and said gear position signal generating circuit, for generating said output rectangular voltage.

10. An actuating oil pressure control system for a torque converter automatic transmission according to claim 1 further including a gear position signal generating circuit connected with said operational circuit for supplying at least a voltage signal indicating the position of said speed change gears, whereby said operational circuit generates said output voltage due to the combination of the voltage signal from said gear position signal generating circuit and the voltage signals from said two detecting circuits.

11. An actuating oil pressure control system for a torque converter automatic transmission according to claim 10 wherein said operational circuit comprises, a sawtooth wave generating circuit connected with said load detecting circuit for integrating at a constant period the electrical voltage signal of said load detecting circuit and generating a sawtooth wave voltage signal; a comparator connected with said vehicle speed signal generating circuit and said sawtooth wave generating circuit, for comparing the electrical voltage signal from said vehicle speed signal generating circuit with the sawtooth wave voltage signal from said sawtooth wave generating circuit and generating an output signal; and a pulse width limiting circuit connected with said sawtooth wave generating circuit, said comparator and said gear position signal generating circuit for generating an output rectangular signal due to the sawtooth wave voltage signal from said sawtooth wave generating circuit, the output signal from said comparator and the voltage signal from said gear position signal generating circuit.

* * * * *